May 15, 1934.   S. J. PEHRSSON   1,958,494
WHEELED VEHICLE
Filed April 19, 1930
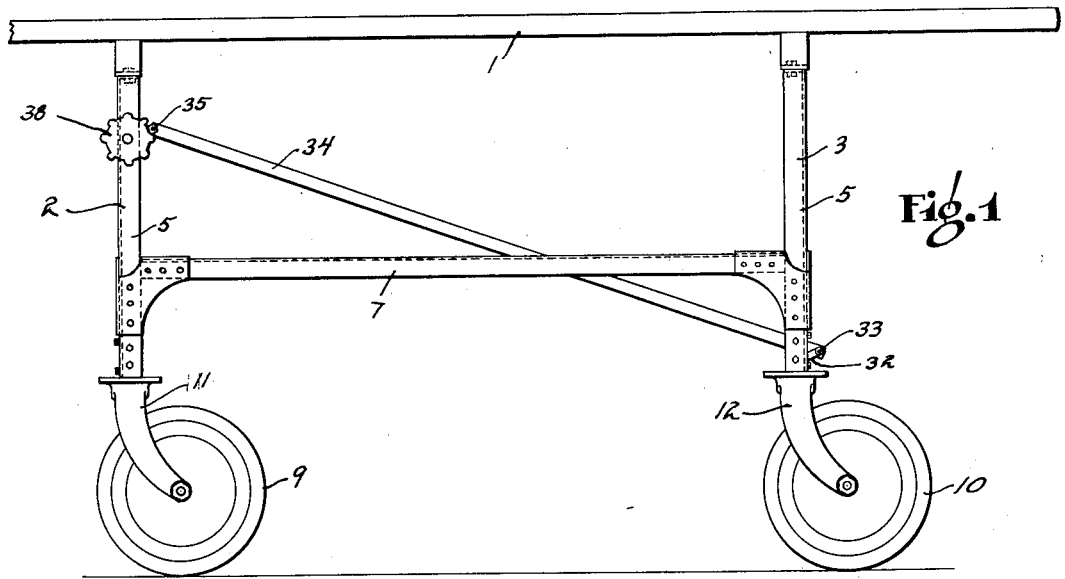
Fig. 1
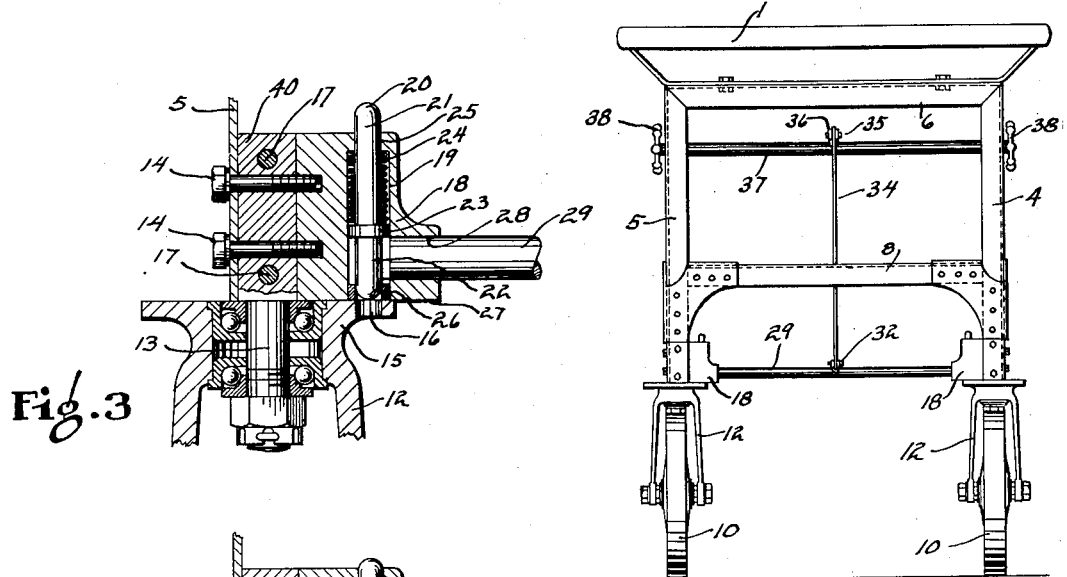
Fig. 3
Fig. 2
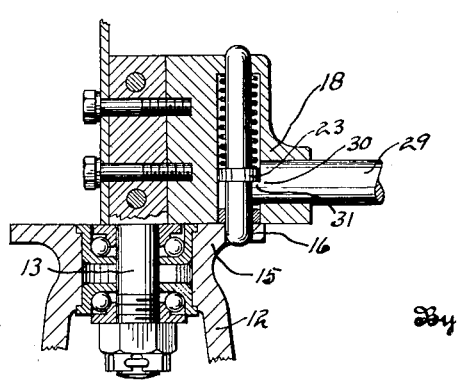
Fig. 4
Inventor
Sven Johan Pehrsson
By Slough and Canfield
Attorney Patented May 15, 1934

1,958,494

UNITED STATES PATENT OFFICE 1,958,494

WHEELED VEHICLE

Sven Johan Pehrsson, Elyria, Ohio, assignor to The Colson Company, Elyria, Ohio, a corporation of Ohio Application April 19, 1930, Serial No. 445,578

8 Claims. (Cl. 280—49)

This invention relates to wheeled vehicles and particularly to vehicles of which some or all of the wheels are of the castering type.

My invention may be applied to various types of vehicle, but I have chosen to describe and illustrate it herein in connection with a vehicle of the hospital bed or stretcher type.

Vehicles of this general class are commonly propelled by hand. On some occasions it is desirable to propel the vehicle over long distances, such as through a long corridor, and in these cases, the most satisfactory operation is obtained if the leading or the trailing wheels are of the castering type and the others of the non-castering type. This permits easy steering of the vehicle. There are occasions, however, when it is desired to turn the vehicle in very small space or to move it bodily laterally in order to position it where desired, and in these cases the vehicle can be most conveniently moved, if all of the wheels are of the castering type.

It is, therefore, one of the objects of this invention to provide a wheeled vehicle of which some of the wheels may be of the castering type and the other wheels of which may be both castering and non-castering and quickly and easily convertible from one type to the other by the operator of the vehicle.

It is another object to provide a vehicle having leading and trailing wheels, one or the other of which sets of wheels may be converted from non-castering to castering or vice versa by a simple hand movement of the operator and when converted into non-castering will be locked in that condition and remain so locked indefinitely.

Another object is to provide a vehicle of the class described in which the wheels locked against castering may be by a simple movement of the hand of the operator converted into castering wheels and will remain indefinitely in castering condition.

Another object is to provide a vehicle of the class described having two wheels at one end of the vehicle, both of which may simultaneously and by a single movement of the operator be converted from castering to non-castering or vice versa by the operator and will remain in either condition as long as desired.

Other objects of my invention will be apparent to those skilled in the art to which my invention pertains.

My invention is fully disclosed in the following description taken in connection with the accompanying drawing, in which:—

Fig. 1 is a side elevational view of a vehicle of the stretcher type in which my invention is embodied;

Fig. 2 is an elevational view taken from the right hand end of Fig. 1;

Fig. 3 is a cross-sectional view to an enlarged scale of a part of Fig. 2 with parts thereof in one operative position;

Fig. 4 is a view similar to Fig. 3 with the parts in another operative position.

Referring to the drawing, I have shown at 1 the bed of the stretcher supported on a frame comprising front and rear downwardly open U-shaped supports 2 and 3 having side legs 4 and 5, and upper cross members 6. The side legs 5—5 and 4—4 are connected by longitudinal braces 7—7, and each pair of legs 5 and 4 are connected by transverse braces 8—8.

The vehicle is provided with a pair of front or leading wheels 9 and a pair of rear or trailing wheels 10, which are preferably of the castering type having forks 11 and 12 mounted for oscillation or castering rotation about vertical axes in suitable bearings secured to the lower ends of the legs 4 and 5.

As shown in Figs. 3 and 4, the yokes of the forks 12 are provided with ball bearings for castering purposes, the bearing construction comprising a vertical stud or shaft 13 upon which the ball bearing elements are mounted and around the axis of which the forks caster or swivel, the studs 13 extending upwardly beyond the bearing in suitably formed attaching portions 40 whereby they may be rigidly bolted to the lower ends of the legs 4 and 5 by bolts 14—14.

The parts thus far described constitute no essential part of my invention and may be variously modified in accordance with any preferred design.

In the practice of my invention, however, the trailing wheels 10 are provided with structural features associated with other structural features of the stretcher as a whole, whereby the wheels 10 may be locked against castering at the will of the operator or freed and permitted to caster. Preferably, the leading wheels 9 are permitted to caster free at all times. The upper ends of the yokes 12 of the trailing wheels 10 are formed into flanges 15 provided each with a perforation 16, the perforations being disposed laterally with respect to the studs 13 and are so located that when the wheels 10 are in their castered position for straight ahead movement, the two perforations 16 of the two yokes 12 lie between the two studs 13.

Secured to the legs 5 and 4, adjacent their lower ends by means of the bolts 14—14 referred to and if desired also by other bolts 17—17, are locking heads 18—18. The heads 18 are provided with vertical bores 19 within which are vertically reciprocatively mounted plungers 20 having an upwardly directed tail piece 21 for guiding the upper end of the plunger and with a pin 22 on the lower end and with a shoulder 23 therebetween.

A spring 24 is disposed within the bore 19 and abuts upon the shoulder 23 to tend to resiliently thrust the plunger 20 downwardly. The upper end of the bore has a small diameter portion 25 engaged by the tail 21 and the lower end of the bore 19 is correspondingly constricted to guide the pin 22 by means of an axially short sleeve or washer 26 in the bore 19.

The head 18 is formed to have a substantially horizontal face 27 in contact with the upper horizontal face of the flange 15, so that upon swiveling movement of the fork 12 the flange and the head 18 are substantially in engagement with each other.

The bore 19 is so disposed relative to the axis of the stud 13 that upon rotation of the fork 12, the perforation 16 may be brought into registration with the pin 22 and the latter may be projected into the perforation 16 by means of the spring 24 and when it has entered the perforation 16, as will now be clear, the fork 12 is locked to the head 18 and hence to the legs 5 and 4 and further swiveling of the wheel is prevented, and correspondingly when the pin is withdrawn from the perforation 16, the fork 12 will be free to rotate and the wheel 10 free to swivel or caster. The pin 22 may be withdrawn at will from the perforation 16 or permitted to be projected thereinto by the following mechanism.

The two heads 18—18, one on each of the legs 5 and 4, have horizontally disposed axially aligned bearing bores 28 therein and in these bearings a transverse shaft 29 is rotatably mounted. At the extreme right and left hand ends of the shaft 29, it is cut away, as plainly shown in Fig. 4 at 30, to provide a transverse shoulder 31 in the end of the shaft 29. The end of the shaft 29 terminates adjacent the side of the pin 22.

When the shaft 29 is rotated, the shoulder 31 will engage the lower face of the flange 23, as shown in Fig. 4, and will lift the plunger 20 from the position shown in Fig. 4 to the position shown in Fig. 3. If rotation of the shaft 29 is stopped at this point, the plunger 20 will be locked or retained in its retracted position. Again, at will, upon rotating the shaft 29 through a quarter of a revolution in the reverse direction, the shaft will take up the position shown in Fig. 4, releasing the flange 23 and permitting the plunger to be projected downwardly and upon stopping rotation of the shaft 29 in that position, Fig. 4, the plunger 20 will be locked or retained in its projected position.

For rotating the shaft 29 as above described through approximately a quarter of a revolution in opposite directions, at the will of the operator, there is provided on the shaft 29 at a point between the two heads 18 a bell crank or arm 32, and pivoted to the bell crank as at 33 is a reach rod element 34 extending to the forward end of the vehicle and pivoted at its other end, as at 35 to another bell crank or arm 36 secured to a second transverse shaft 37 mounted in suitable bearings in or on the side legs 5 and 4 at the front end of the stretcher.

The shaft 37 extends laterally through the side legs and terminates at either end in handles 38—38, the handle 38, the shaft 37, the arms 32 and 36 and the reach rod element 34 together constituting handle means for rotating the rotary element to operate the locking means.

By this construction, it will be apparent that the operator may upon turning either of the handles 38 rock the two bell cranks 36 and 32 and give to the shaft 29 a movement in either direction, and the movement of the shaft 29 will, depending upon the direction in which it is turned, either withdraw the pin 22 from the perforation 16 and release the wheels 10 permitting them to caster, or will permit the pin 22 to be projected into the perforation 16 to lock the wheels 10 against castering.

When the shaft 29 is turned in the direction to lock the wheels, if the perforation 16 does not happen to be in a registering position relative to the pin 22, a slight lateral movement of the stretcher as a whole will cause the wheels 10 to caster around the studs 13 and will move the perforation 16 into said registering position, whereupon the pin 22 will be shot downwardly thereinto to lock the same.

Thus, in the vehicle above described, it may be propelled whenever desired with the wheels 10 locked against castering and the wheels 9 castering and upon occasion when desired the wheels 10 may be caused to caster by a simple turning movement by either of the hand wheels 38 and correspondingly subsequently locked against castering by a corresponding movement of the handles 38 in the other direction.

By suitably positioning the perforations 16 in the flanges 15, the wheels 10 when locked by the pins 22 in the perforations will point or roll straight ahead and steering of the vehicle may be performed by the wheels 9.

The bell cranks 32 and 36 are preferably disposed around the axes of their respective shafts 29 and 37, so that when they are thrown to their positions of extreme throw, they approach a dead center relation to the reach rod 34 and tendency of accidental movement of the shafts 29 and 37 is thus prevented. This is particularly advantageous when the shaft 29 is in the position shown in Fig. 3 and prevents the accidental projection of the pin 22 into the perforation 16. The parts may be so arranged, as will be understood, that when the pin 22 is in the retracted position, the bell cranks and reach rod 34 will be in the position shown in Fig. 1 and thus the weight of the reach rod 34 tends to hold the bell cranks in the position shown, thus tending further to prevent the accidental rotation in the other direction of the shaft 29.

My invention is not limited to the exact details of construction shown and described. Many changes and modifications may be made therein without departing from the spirit of my invention or sacrificing its advantages.

I claim:

1. In a wheeled vehicle, a frame, a support rotatable on the frame and having a generally vertical axis, a supporting wheel on the support having a ground contact point displaced laterally of the said axis, whereby when the frame is moved laterally, it may swing around the ground contact point and relatively rotate the support on the frame, the support being provided with a recess, a pin on the frame adapted to enter the recess to lock the support to the frame upon relative rotation of the support to a predetermined wheel directional position, means for withdrawing the pin from the recess to permit disengagement of the support and the frame, said means comprising a shoulder on the pin, a rotary element on the frame, a shoulder on the rotary element engageable with the shoulder on the pin to withdraw the pin upon rotation of the rotary element, and manual means for rotating the rotary element.

2. In a wheeled vehicle, a frame, a support rotatable on the frame having a generally vertical axis, a supporting wheel on the support having the ground contact point displaced laterally of the said axis, whereby when the frame is moved laterally, it may swing around the ground contact point and relatively rotate the support on the frame, the said support being provided with a recess, a plunger on the frame, a spring adapted to react upon the frame and upon the plunger to project the plunger into the recess to lock the bearing support and the frame upon the relative rotation of the support to a predetermined wheel directional position, a rotary shaft on the frame, a projection on the shaft adapted when rotated to engage the plunger to withdraw the same from the recess, and means for rotating the rotary shaft comprising a bell crank on the shaft, a handle and a connection between the handle and the bell crank.

3. In a wheeled vehicle, a frame, a pair of supporting wheels on the frame having uni-directional alignment therewith, a pair of supports rotatable on the frame and having a generally vertical axis, a pair of supporting wheels on the supports and having ground contact points displaced laterally of the said axis, whereby when the frame is moved laterally it may swing around the ground contact point and relatively rotate the supports on the frame, said supports comprising a yoke having a rotative bearing connection with the frame, a head on each yoke provided with a substantially horizontal plane, a pair of plungers on the frame adapted to be held in spring-pressed engagement with said surfaces during rotation of the yokes, each yoke being provided with a recess in said surface, whereby upon relative rotation of the supports to a predetermined wheel directional position the plungers will be projected into the recesses to lock the frame against rotation, and means for withdrawing the plungers to permit rotation, said means comprising a transverse rotary shaft on the frame, mutually engaging projections on the ends of the shaft and on the plungers, and means for rotating the shaft comprising a bell crank on the shaft, a handle on the frame and a connection between the handle and the bell crank.

4. In a wheeled vehicle, a frame, a pair of supports rotatable on the frame and having generally vertical axes, a supporting wheel on each support having their ground contact points displaced laterally of the said axes whereby when the frame is moved laterally the wheels may swing around their ground contact points and relatively rotate their supports on the frame, the said supports being provided each with a recess, a pair of plungers on the frame, springs adapted to react on the frame and on the plungers to project them into their recesses to lock the supports and the frame, upon relative rotation of the supports to a predetermined wheel directional position, a rotary shaft on the frame, a pair of projections on the shaft adapted when rotated to engage the plungers to withdraw them from the recesses, and means for rotating the shaft comprising a handle and a connection between the handle and the shaft.

5. A vehicle as described in claim 2 and in which the connection between the handle and the shaft comprises a bell crank on the shaft, a rod element connecting the handle and the bell crank, and the bell crank projecting laterally from the shaft whereby the weight of the rod element tends to prevent rotation of the shaft in the opposite direction on rotation of the shaft to either the locking or unlocking position.

6. In a wheeled vehicle, a frame, a support rotatable on the frame and having a generally vertical axis, a supporting wheel on the support having a ground contact point displaced laterally of the said axis, whereby when the frame is moved laterally, it may swing around the ground contact point and relatively rotate the support on the frame, locking elements respectively on the support and frame adapted to be relatively moved into locking engagement to lock the support to the frame only upon relative rotation of the support to a predetermined straight ahead wheel directional position, means for unlocking the elements, said unlocking means comprising a rotary element associated with one of the locking elements for moving it to unlocked position when rotated, and rotatably supported on the frame, and manual means for rotating the rotary element comprising handle means, one of the said locking elements adapted to be spring pressed toward a position of locked engagement with the other locking element and automatically locked with it upon rotation of the support to a predetermined straight-ahead wheel directional position, and the rotary element upon rotation in the unlocking direction adapted to retract the spring-pressed locking element.

7. In a wheeled vehicle, a frame, a support rotatable on the frame and having a generally vertical axis, a supporting wheel on the support having a ground contact point displaced laterally of the said axis, whereby when the frame is moved laterally, it may swing around the ground contact point and relatively rotate the support on the frame, locking elements respectively on the support and frame adapted to be relatively moved into locking engagement to lock the support to the frame only upon relative rotation of the support to a predetermined straight-ahead wheel directional position, means for unlocking the elements, said unlocking means comprising a rotary element associated with one of the locking elements for moving it to unlocked position when rotated, and rotatably supported on the frame, and manual means for rotating the rotary element comprising handle means, said means comprising an arm on said rotary element projecting laterally therefrom and the weight of the handle means tending to prevent rotation of the rotatable element in the opposite direction on rotation thereof to either the locking or unlocking position.

8. In a wheeled vehicle, a frame, a support rotatable on the frame and having a generally vertical axis, a supporting wheel on the support having a ground contact point displaced laterally of the said axis, whereby when the frame is moved laterally, it may swing around the ground contact point and relatively rotate the support on the frame, locking elements respectively on the support and frame adapted to be relatively moved into locking engagement to lock the support to the frame only upon relative rotation of the support to a predetermined straight-ahead wheel directional position, means for unlocking the elements, said unlocking means comprising a rotary element associated with one of the locking elements for moving it to unlocked position when rotated, and rotatably supported on the frame, and manual means for rotating the rotary element comprising handle means, said handle means comprising an arm on the rotatable element, means connected to the arm on the rotatable element, a rod element connected at one end to the arm and at its opposite end to manual means for moving the rod longitudinally and disposed adjacent an upper portion of the vehicle.

SVEN JOHAN PEHRSSON.